United States Patent
Johansson et al.

(10) Patent No.: US 10,131,227 B2
(45) Date of Patent: Nov. 20, 2018

(54) DRIVER INTERACTION PERTAINING TO ECONOMICAL CRUISE CONTROL

(75) Inventors: Oskar Johansson, Stockholm (SE);
Maria Södergren, Segeltorp (SE);
Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 436 days.

(21) Appl. No.: 14/116,435

(22) PCT Filed: May 9, 2012

(86) PCT No.: PCT/SE2012/050488
§ 371 (c)(1),
(2), (4) Date: Nov. 8, 2013

(87) PCT Pub. No.: WO2012/158097
PCT Pub. Date: Nov. 22, 2012

(65) Prior Publication Data
US 2014/0074370 A1    Mar. 13, 2014

(30) Foreign Application Priority Data

May 16, 2011    (SE) ...................................... 1150441

(51) Int. Cl.
*B60K 31/00*   (2006.01)
*B60W 50/00*   (2006.01)
(Continued)

(52) U.S. Cl.
CPC ........... *B60K 31/00* (2013.01); *B60W 30/143* (2013.01); *B60W 50/0097* (2013.01);
(Continued)

(58) Field of Classification Search
USPC ..................................... 701/93; 123/349, 350
See application file for complete search history.

(56) References Cited

U.S. PATENT DOCUMENTS 6,470,256 B1 * 10/2002 Cikalo et al. .................. 701/93
6,496,108 B1   12/2002 Bäker et al.
(Continued)

FOREIGN PATENT DOCUMENTS

CN           101500839 A    8/2009
DE   10 2005 014 149 A1   10/2005
(Continued)

OTHER PUBLICATIONS

International Search Report dated Sep. 5, 2012 issued in corresponding International patent application No. PCT/SE2012/050488.
(Continued)

*Primary Examiner* — James M McPherson
(74) *Attorney, Agent, or Firm* — Ostrolenk Faber LLP

(57) ABSTRACT

A method for an economical cruise control and an economical cruise control which demands from a vehicle engine system a reference speed $v_{ref}$, which may differ from a chosen set speed $v_{set}$. Adjustment of at least the set speed $v_{set}$ is allowed when the reference speed $v_{ref}$ differs from the set speed $v_{set}$. The adjustment is based at least partly on input from a user of the economical cruise control. A user of the economical cruise control is thus provided with an increased feeling of control over the vehicle's speed.

19 Claims, 5 Drawing Sheets

Figure 1:
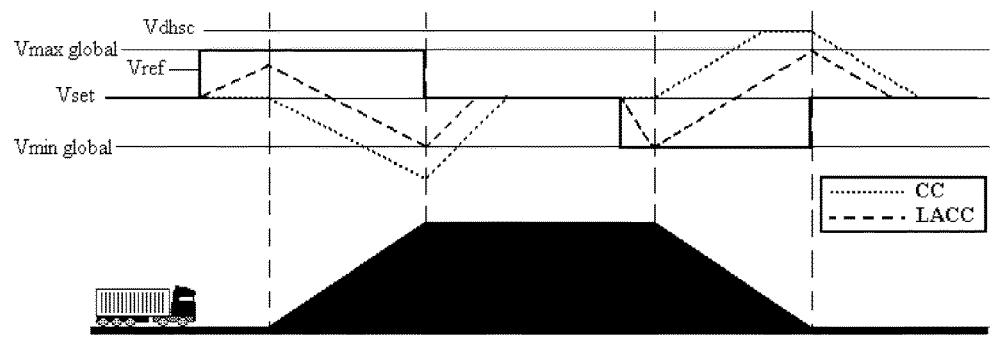

(51) Int. Cl.
  *B60W 50/08* (2012.01)
  *B60W 30/14* (2006.01)
(52) U.S. Cl.
  CPC ..... *B60W 50/082* (2013.01); *B60W 2550/143* (2013.01); *B60W 2550/402* (2013.01); *B60W 2720/103* (2013.01); *Y02T 10/52* (2013.01); *Y02T 10/84* (2013.01)

(56) References Cited

U.S. PATENT DOCUMENTS

| | | | |
|---|---|---|---|
| 2004/0084237 A1 | 5/2004 | Petrie, Jr. | |
| 2007/0265759 A1* | 11/2007 | Salinas et al. | 701/93 |
| 2008/0059035 A1* | 3/2008 | Siddiqui et al. | 701/93 |
| 2008/0306668 A1* | 12/2008 | Wang et al. | 701/93 |
| 2009/0132142 A1* | 5/2009 | Nowak et al. | 701/93 |
| 2010/0204896 A1* | 8/2010 | Biondo et al. | 701/93 |
| 2010/0217494 A1* | 8/2010 | Heft et al. | 701/70 |
| 2010/0318273 A1* | 12/2010 | Aleksic et al. | 701/98 |
| 2011/0276216 A1* | 11/2011 | Vaughan | 701/29 |
| 2012/0083984 A1* | 4/2012 | Johansson et al. | 701/70 |
| 2013/0030668 A1* | 1/2013 | Eriksson et al. | 701/94 |

FOREIGN PATENT DOCUMENTS

| | | | |
|---|---|---|---|
| DE | 10 2008 038 078 A1 | | 5/2009 |
| EP | 0 813 988 A2 | | 12/1997 |
| JP | 6-156118 | | 6/1994 |
| JP | 2000-085406 | | 3/2000 |
| JP | 2003-343305 | | 12/2003 |
| KR | 2009 0078954 | | 7/2009 |
| WO | WO 2007/042988 A2 | | 4/2007 |
| WO | WO 2008/094113 A1 | | 8/2008 |
| WO | WO 2010 088869 A1 | | 8/2010 |
| WO | WO2010/144031 | * | 10/2010 |
| WO | WO 2010/144031 A1 | | 12/2010 |

OTHER PUBLICATIONS

International Preliminary Report on Patentability dated Jun. 27 2013 issued in corresponding International patent application No. PCT/SE2012/050488.
Japanese Office Action, dated Nov. 18, 2014, issued in corresponding Japanese Patent Application No. 2014-511320. English translation. Total 1 page.
English translation of Japanese Office Action dated Mar. 17, 2015 in corresponding Japanese Patent Application No. 2014-511320.
Chinese Office Action, dated Jul. 2, 2015, issued in corresponding Chinese Patent Application No. 201280023428.7. Includes English Translation. Total 23 pages.
Korean Office Action dated Aug. 29, 2015 in corresponding Korean Patent Application No. 10-2013-7033438, along with an English translation of relevant portions thereof.
Supplementary European Search Report dated Mar. 23, 2016 in corresponding European Patent Application No. 12 78 6536.
Notification of Reason for Refusal dated May 9, 2016 in corresponding Korean Patent Application No. 10-2013-7033438, along with English translation thereof.

* cited by examiner

DRIVER INTERACTION PERTAINING TO ECONOMICAL CRUISE CONTROL

CROSS-REFERENCE TO RELATED APPLICATIONS

The present application is a 35 U.S.C. §§ 371 national phase conversion of PCT/SE2012/050488, filed May 9, 2012, which claims priority of Swedish Patent Application No. 1150441-2, filed May 16, 2011 the contents of which are incorporated by reference herein. The PCT International Application was published in the English language.

TECHNICAL FIELD

The present invention relates to a method for an economical cruise control and an economical cruise control. The present invention relates also to a computer program and a computer program product which implement the method according to the invention.

BACKGROUND

Motor vehicles today, e.g. cars, trucks and buses, are usually provided with cruise control. An object of cruise control is to achieve a uniform predetermined vehicle speed. This is done either by adjusting the engine torque to avoid retardation, or by applying brake action on downhill runs where the vehicle is accelerated by its own weight. A more general object of cruise control is to achieve convenient driving and greater comfort for the vehicle's driver.

A driver of a motor vehicle with cruise control usually chooses a set speed $v_{set}$ as the speed which he/she wishes the vehicle to maintain on level roads. A cruise control then provides an engine system of the vehicle with a reference speed $v_{ref}$ which is used for controlling the engine. The set speed $v_{set}$ may therefore be regarded as an input signal to the cruise control, and the reference speed $v_{ref}$ as an output signal from the cruise control, which is used for controlling the engine.

In today's traditional cruise controls (CC), the reference speed $v_{ref}$ is identical with the set speed $v_{set}$ set by the user of the system, e.g. a driver of the vehicle. Today's traditional cruise controls therefore maintain a constant reference speed corresponding to the set speed $v_{set}$ set by the driver. The value of the reference speed $v_{ref}$ is here altered only when the user him/herself adjusts it during the journey.

There are today cruise controls, so-called economical cruise controls, e.g. Ecocruise and similar cruise controls, which try to estimate current running resistance and also have knowledge of historical running resistance.

An experienced driver using a vehicle without cruise control can reduce fuel consumption by adapting his/her driving to the characteristics of the road ahead so that unnecessary braking and/or fuel-consuming acceleration can be avoided. A further development of these economical cruise controls tries to mimic the experienced driver's adaptive driving on the basis of knowledge of the road ahead, so that fuel consumption can be kept as low as possible, since this very greatly affects profitability for an owner of the vehicle, e.g. a haulage company or the like.

An example of such a further development of an economical cruise control is a "look ahead" cruise control (LACC), i.e. a strategic cruise control which uses knowledge of sections of road ahead, i.e. knowledge of the nature of the road in front, to determine the configuration of the reference speed $v_{ref}$. Here the reference speed $v_{ref}$ is therefore allowed, within a speed range, to differ from the set speed $v_{set}$ chosen by the driver, in order to drive in a way which saves more fuel.

Knowledge of the road section ahead may for example comprise prevailing topology, road curvature, traffic situation, roadworks, traffic density and state of road. It may also comprise a speed limit for the road section ahead and a traffic sign beside the road. This knowledge may for example be obtained from location information, e.g. GPS (global positioning system) information, map information and/or topographical map information, weather reports, information communicated between different vehicles and information communicated by radio. These different types of knowledge may be used in various ways. For example, knowledge of a speed limit ahead may be used for fuel efficiency by lowering the vehicle's speed before the speed limit zone is reached. Similarly, knowledge of a road sign conveying information about, for example, a roundabout or intersection ahead may also be used for fuel efficiency by braking before reaching the roundabout or intersection. Basing cruise control on positioning information in combination with topographical map information makes it possible to avoid incorrect decisions due to a driver's misperception of a road gradient. For example, a driver may misinterpret the surroundings as indicating a downhill run ahead of the vehicle, whereas the topographical map data may directly and correctly indicate that what is actually there is an uphill run. When the vehicle reaches the section of road ahead, a good driver will appreciate that a correct decision was arrived at on the basis of the positioning information in combination with the map data. His/her acceptance of the function is thereby increased.

An economical cruise control may for example predict the vehicle's speed along a horizon of any suitable length, e.g. about 1-2 km. The vehicle's future speed along the horizon is predicted in various ways such as driving with traditional cruise control at a reference speed $v_{ref}$ which is the same as the set speed $v_{set}$, or varying the reference speed $v_{ref}$ relative to the set speed $v_{set}$.

A look-ahead cruise control (LACC) for example allows the reference speed $v_{ref}$ to be raised, before a steep climb, to a level above the set speed $v_{set}$, since the vehicle will presumably lose speed on the steep upgrade owing to high train weight relative to engine performance. Similarly, the LACC allows the reference speed $v_{ref}$ to drop to a level below the set-speed $v_{set}$ before a steep downgrade, since on such a downhill run the vehicle will presumably be accelerated by its high train weight. The concept here is that it is better from a fuel economy perspective to take advantage of the vehicle's acceleration by its own weight downhill than to initially accelerate before the downgrade and then brake downhill. The LACC can thus reduce fuel consumption without journey time being affected.

There are also cruise controls which use a current running resistance as a basis for deciding how the vehicle's speed should vary. In such cruise controls, the reference speed $v_{ref}$ can be allowed to deviate from the set speed $v_{set}$ on the basis of at least one characteristic of the running resistance, e.g. its magnitude and/or pattern over time.

In this specification, the invention is exemplified for use in, or in combination with, a cruise control system, e.g. a look-ahead cruise control (LACC), i.e. a strategic cruise control, which can use knowledge of the nature of the road ahead to control the reference speed $v_{ref}$. The invention may however be implemented in, or in combination with, substantially any cruise control in which the reference speed $v_{ref}$ can be allowed to differ from the set speed $v_{set}$.

As mentioned above, an LACC has knowledge of the vehicle's location and local topography, but other parameters may also affect the reference speed $v_{ref}$ which a driver wishes the system to use as an output signal. Such parameters may comprise for example other road users and how they behave in traffic. Another such parameter might be a prevailing traffic situation, e.g. roadworks.

BRIEF DESCRIPTION OF THE INVENTION

As not all LACCs have knowledge of and/or can take into account all of the parameters which would have influenced a driver's own choice of reference speed $v_{ref}$, the system's choice may differ from a reference speed $v_{ref}$ preferred by the driver. This entails problems in that it is very important for the vehicle to behave in a way which feels natural and intuitive to a driver so that he/she will be willing to use the LACC function.

Moreover, a vehicle which behaves in a way which its driver finds strange will also be disturbing to other road users in nearby vehicles.

An object of the present invention is to propose an economical cruise control which a user feels in control of and which at the same time causes a vehicle to be driven in a way which saves fuel.

This object is achieved by the aforesaid method for an economical cruise control. It is also achieved by the aforesaid economical cruise control and by the aforesaid computer program and computer program product.

According to the present invention, adjustment of at least the reference speed $v_{ref}$ is allowed if the reference speed $v_{ref}$ for the economical cruise control differs from the set speed $v_{set}$, i.e. if $v_{ref} \neq v_{set}$. According to the present invention, this adjustment is based at least partly on input from the user of the economical cruise control.

The present invention allows a user of the economical cruise control to alter the reference speed $v_{ref}$ so that it then differs from the reference speed $v_{ref}$ which the cruise control regards as optimum at the time. This makes it possible for the user, who may be a driver of the vehicle, to feel that he/she does at least to some extent control the economical cruise control and hence the vehicle's speed, which many users will find very positive. This positive feeling of to some extent controlling the vehicle's speed when it is being controlled by the economical cruise control may then increase a driver's willingness to use the economical cruise control and/or may reduce the risk of his/her switching it off. The resulting user-controlled limitation of the economic cruise control affirms the driver's wish to be able to influence the vehicle's speed. The overall result when use of the economic cruise control increases as a result of greater driver acceptance of its function is reduced fuel consumption.

According to various embodiments of the invention, the reference speed $v_{ref}$ is set on the basis of driver input to different values appropriate to different driving situations.

For example, according to an embodiment, an input results in the reference speed $v_{ref}$ being set to the set speed $v_{set}$ so that $v_{ref}=v_{set}$. This is advantageous when the driver's intention is to abort the economic cruise control's current decision about the magnitude of the reference speed $v_{ref}$ and to go back to the set speed $v_{set}$. This simple facility makes it possible for the driver to have no difficulty in appreciating that he/she can interact with the cruise control in order to abort a raising or lowering of the reference speed $v_{ref}$ relative to the set speed $v_{set}$.

According to another embodiment, the input results in the reference speed $v_{ref}$ being set to a current speed $v_{pres}$ of the vehicle so that $v_{ref}=v_{pres}$. This is advantageous in that the driver input may here be regarded as indicating that the current speed $v_{pres}$ at which the vehicle is for example travelling on a hill is acceptable to him/her. This embodiment also affords potential for further fuel savings.

All the embodiments of the invention result in increased driver acceptance of the cruise control's function, which will over time increase its use, leading to lower overall fuel expenditure.

BRIEF LIST OF DRAWINGS

Figure 2:
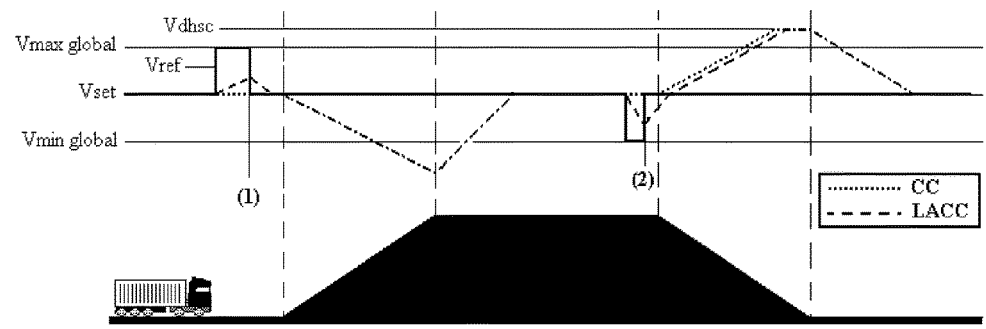
Figure 3:
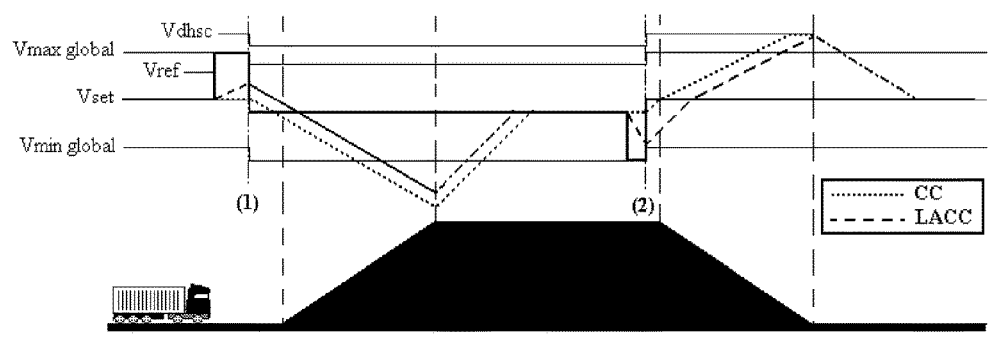
Figure 4:
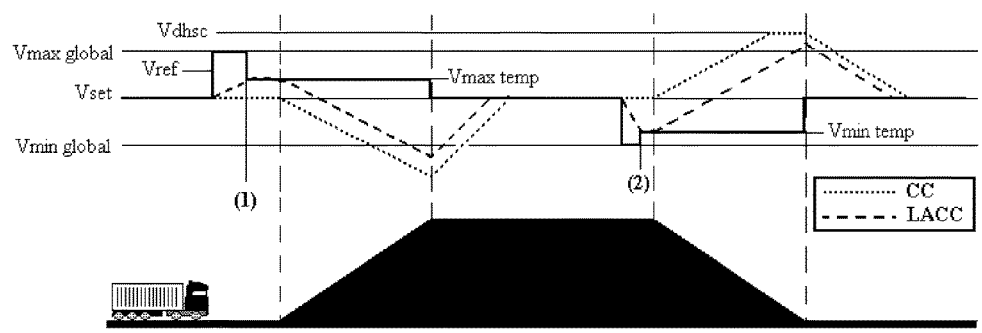
Figure 5:
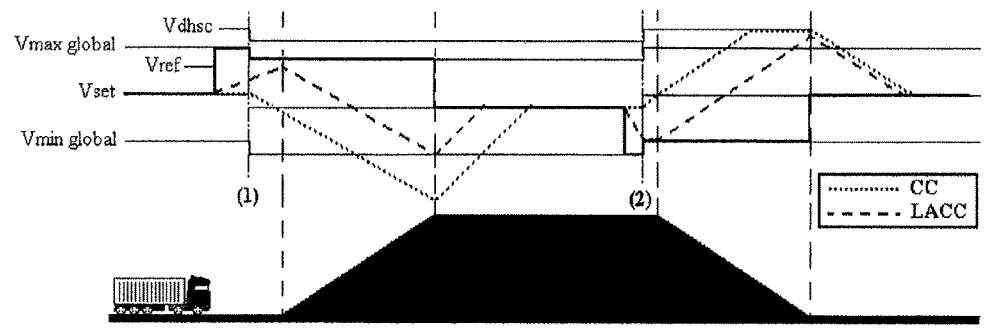
Figure 6:
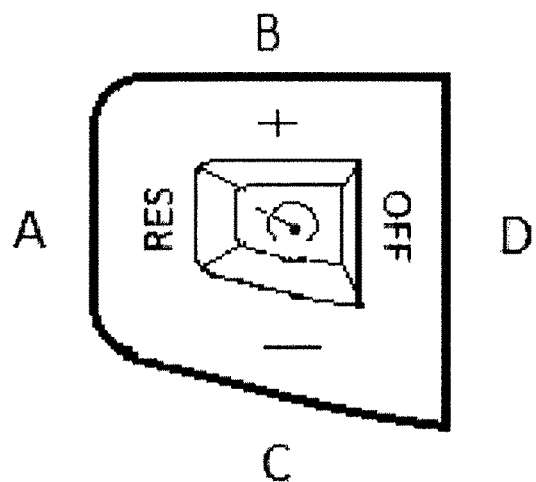
Figure 7:
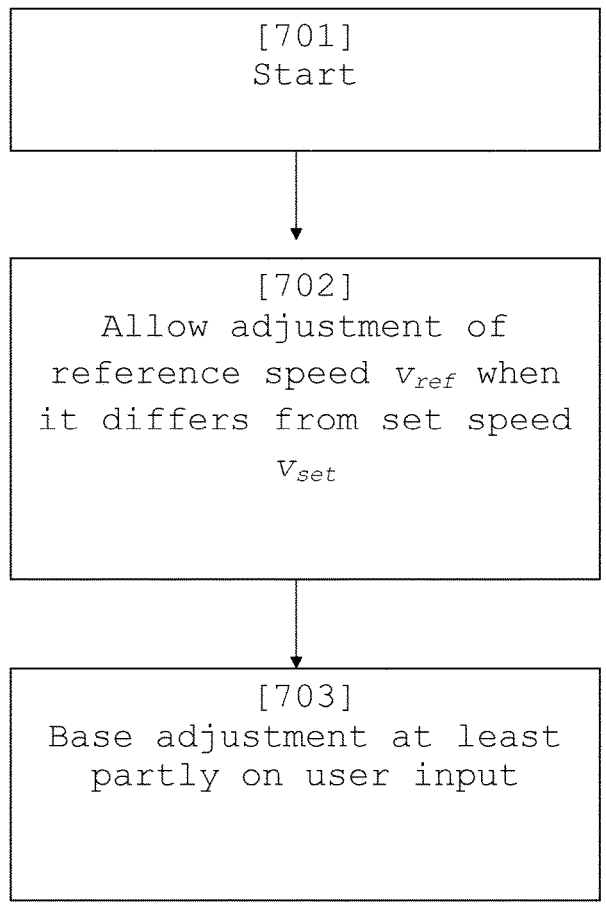
Figure 8:
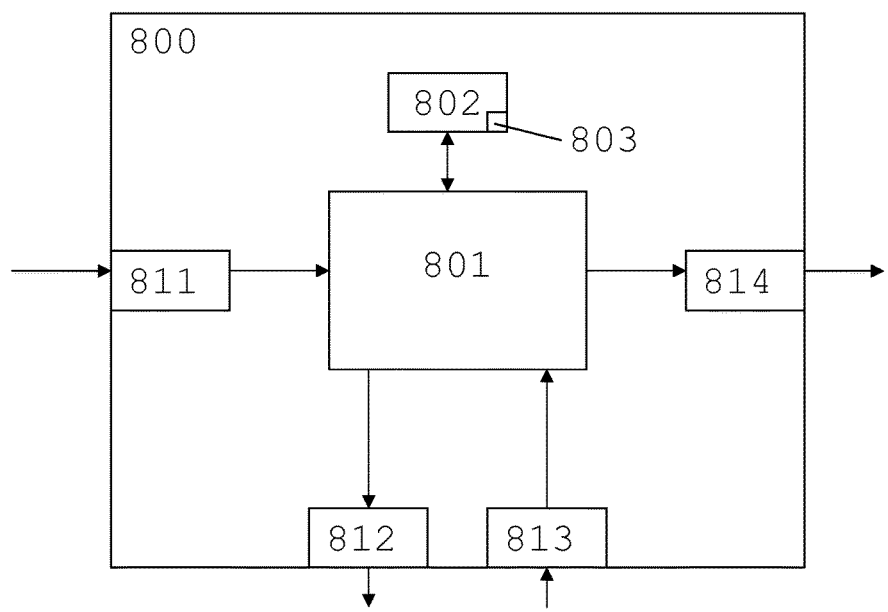

The invention is explained in more detail below with reference to the attached drawings, in which the same reference notations are used for similar items, and in which:
 FIG. 1 depicts an example of speeds in a driving situation,
 FIG. 2 depicts an example of speeds in a driving situation,
 FIG. 3 depicts an example of speeds in a driving situation,
 FIG. 4 depicts an example of speeds in a driving situation,
 FIG. 5 depicts an example of speeds in a driving situation,
 FIG. 6 depicts an example of an input device,
 FIG. 7 is a flowchart for the method according to the invention,
 FIG. 8 depicts a control unit which works according to the invention.

DESCRIPTION OF PREFERRED EMBODIMENTS

The present invention allows a user of the economical cruise control to influence the reference speed $v_{ref}$ so that it then differs from that which the cruise control regards as optimum at the time.

In other words, the present invention allows adjustment of at least the reference speed $v_{ref}$ when the reference speed $v_{ref}$ for the economical cruise control differs from the set speed $v_{set}$. This adjustment is based at least partly on input from the user of the economical cruise control.

The adjustment according to the present invention imposes a limitation upon the economical cruise control's control of the reference speed $v_{ref}$. The adjustment may result in the economical cruise control using a reference speed $v_{ref}$ which it regards as suboptimised.

However, the adjustment means that the user can at least partly influence the reference speed $v_{ref}$, which gives him/her, e.g. a driver, a feeling of having control over the economical cruise control. This may in itself increase a driver's willingness to use the economical cruise control.

The present invention thus results in a user-controlled limitation of the economical cruise control's ability to choose the magnitude of the reference speed $v_{ref}$. The user's willingness to be able to influence the reference speed $v_{ref}$ is thereby affirmed.

FIG. 1 depicts an example of what a speed for a vehicle with a traditional cruise control (CC: dotted line) would be like on a section of road where an upgrade is followed by a plateau and a downgrade. With a traditional cruise control the reference speed $v_{ref}$ is set equal to the set speed $v_{set}$ all the time. The economical cruise control endeavours where possible to keep the vehicle's speed within the range between an overall lowest permissible speed $v_{min\ glob}$ and an overall highest permissible speed $v_{max\ glob}$. However, these lowest and highest permissible speeds are primarily intended to serve as limits for the speeds which are permissible on a hill in order to ensure that the vehicle's speed undergoes optimum variation in relation to prioritisation of driving time and/or fuel consumption. The lowest permissible speed $v_{min\ glob}$ therefore indicates how great the vehicle's speed is allowed to be before a downgrade, and the highest permissible speed $v_{max\ glob}$ indicates how great it is allowed to be before an upgrade.

The diagram shows that the vehicle's speed with the traditional cruise control (CC) is below an overall lowest permissible speed $v_{min\ glob}$ at the crest of the hill and above the overall highest permissible speed $v_{max\ glob}$ at the end of the downgrade. This in itself is not too serious, but what from the fuel saving perspective is serious is that the vehicle's acceleration is actually braked away by the constant speed brake when a downhill speed control (DHSC) speed $v_{dhsc}$ is reached. A constant speed brake regulates the speed of for example heavy vehicles on downgrades by using auxiliary brakes, e.g. a retarder and an exhaust brake, a four-stage electromagnetic brake (Telma) and/or a Volvo exhaust brake (VEB). The traditional cruise control is therefore not optimum for speed control on undulating/hilly roads involving downhill and/or uphill runs.

FIG. 1 also illustrates an example of what a speed of a vehicle with a look-ahead cruise control (LACC: broken line) of today would be like. The LACC bases the reference speed $v_{ref}$ (bold continuous line) inter alia on the set speed $v_{set}$ and on knowledge of topographical information, e.g. information about the upgrade, plateau and downgrade in FIG. 1. The diagram shows clearly that the LACC does not go below the overall lowest permissible speed $v_{min\ glob}$ at the crest of the hill, since the reference speed $v_{ref}$ is allowed to exceed the set speed $v_{set}$ before and during the uphill run. Nor is the overall highest permissible speed $v_{max\ glob}$ exceeded with the LACC, since the reference speed $v_{ref}$ is allowed to be lower than the set speed $v_{set}$ before and during the downhill run. The LACC thus allows the reference speed $v_{ref}$ to differ from the set speed $v_{set}$. FIG. 1 shows what the LACC thinks the reference speed $v_{ref}$ should be like for the LACC's cost function to be optimised. Such a cost function indicates various parameters to be taken into account when taking decisions. The parameters are weighted and decisions are then taken on the basis of the weighted parameters so that a lowest cost for the function is achieved, subject to fulfillment of certain requirements, e.g. speed limits. No energy is braked away by the constant speed brake when the LACC is used, which is optimum from the fuel saving perspective.

According to an embodiment of the present invention, when the reference speed $v_{ref}$ for the economical cruise control differs from the set speed $v_{set}$, the user may adjust at least the reference speed $v_{ref}$ so that it is set to the set speed $v_{set}$, i.e. so that $v_{ref}=v_{set}$.

This embodiment is illustrated in FIG. 2 in which the user influences the reference speed $v_{ref}$ for the LACC at a first time 1. The reference speed $v_{ref}$ (continuous thick line) is thus adjusted to become equal to the set speed $v_{set}$, i.e. $v_{ref}=v_{set}$, so that the raising of the reference speed $v_{ref}$ to a higher value than the set speed $v_{set}$ is aborted close to this first time. The user is thus here allowed to influence the LACC's choice of the reference speed $v_{ref}$.

At a second time 2, the user again influences the reference speed $v_{ref}$ for the LACC by adjusting it so that it is set equal to the set speed $v_{set}$, i.e. $v_{ref}=v_{set}$, with the result that the lowering of the reference speed $v_{ref}$ to a lower value than the set speed $v_{set}$ is aborted at this second time.

The broken line in FIG. 2 represents the vehicle's speed when using LACC with the present invention implemented. The diagram shows that this speed becomes relatively equal to that resulting from a traditional cruise control (dotted line) on the uphill run and until just before the downhill run. On the downhill run the vehicle's speed becomes somewhat lower than with a traditional cruise control, but at the end of the downhill run, as in the case of the traditional cruise control, part of the acceleration is braked away by the constant speed brake.

Analysis of FIG. 2 shows that in certain cases a certain amount of energy has to be braked away when this embodiment of the invention is used, so this cruise control is not optimum from a fuel economy perspective. However, allowing user influence on the reference speed $v_{ref}$ leads to increased user acceptance of the LACC's function. Thus the possibility of influencing the cruise control may result in more drivers to use the LACC more often and counteract their failing to use it or switching it off because of not feeling comfortable with its function. The overall result may be reduced fuel consumption due to increased use of the LACC.

According to an embodiment of the present invention, the set speed $v_{set}$ is set to an upwardly adjusted value $v_{set}=v_{set,\ old}+v_{adj}$ before the adjustment of the reference speed $v_{ref}$ takes place. $v_{set,\ old}$ represents here the value of the set speed before its upward adjustment. This means that the reference speed $v_{ref}$ is set on the basis of user input to an upwardly adjusted value of the set speed so that $v_{ref}=v_{set}=v_{set,\ old}+v_{adj}$.

According to another embodiment of the present invention, the set speed $v_{set}$ is set to a downwardly adjusted value $v_{set}=v_{set,\ old}+v_{adj}$ before the adjustment of the reference speed $v_{ref}$ takes place. $v_{set,\ old}$ represents here the value of the set speed before its downward adjustment. This means that the reference speed $v_{ref}$ is set on the basis of user input to a downwardly adjusted value of the set speed so that $v_{ref}=v_{set}=v_{set,\ old}+v_{adj}$.

Setting the reference speed $v_{ref}$ to an adjusted value of the set speed makes it possible for the adjustment to achieve a relatively large change in the reference speed $v_{ref}$, which may increase a user's feeling of being able to influence the reference speed $v_{ref}$. This is illustrated in FIG. 3.

In the example in FIG. 3, the user influences the reference speed $v_{ref}$ for the LACC at a first time 1. The set speed is here set to a downwardly adjusted value $v_{set}=v_{set,\ old}-v_{adj}$. The reference speed $v_{ref}$ (continuous thick line) is then adjusted to be equal to this downwardly adjusted value of the set speed $v_{set}$ so that $v_{ref}=v_{set}=v_{set,\ old}-v_{adj}$. It should be noted here that the respective overall maximum permissible speed $v_{max\ glob}$ and overall minimum permissible speed $v_{min\ glob}$ and the constant speed brake speed $v_{dhsc}$ are altered by steps similar to the set speed $v_{set}$ in this example. It is however possible, according to other embodiments of the invention, for one or more of the respective overall maximum permissible speed $v_{max\ glob}$ and overall minimum permissible speed $v_{min\ glob}$ and the constant speed brake speed $v_{dhsc}$ to be altered in steps not corresponding to the steps of change in the set speed $v_{set}$.

The set speed is thus here adjusted to a downwardly adjusted value $v_{set}=v_{set,\ old}-v_{adj}$ and the raising of the reference speed $v_{ref}$ to a value higher than the set speed $v_{set}$ is aborted close to this first time. The user is thus here allowed to influence the LACC's choice of both the reference speed $v_{ref}$ and the set speed $v_{set}$.

At a second time 2, the user again influences the reference speed $v_{ref}$ for the LACC. The set speed is here set to an upwardly adjusted value $v_{set}=v_{set,\ old}+v_{adj}$. The reference speed $v_{ref}$ (continuous thick line) is then adjusted so that it is set equal to this upwardly adjusted value of the set speed, i.e. $v_{ref}=v_{set}=v_{set,\ old}+v_{adj}$.

The set speed is thus here adjusted to a upwardly adjusted value $v_{set}=v_{set,\ old}+v_{adj}$ and the raising of the reference speed $v_{ref}$ to a value lower than the set speed $v_{set}$ is aborted close to this second time. The user is thus here allowed to influence the LACC's choice of both the reference speed $v_{ref}$ and the set speed $v_{set}$.

The broken line in FIG. 3 represents the speed of the vehicle when using LACC with the present invention implemented. The diagram shows that no acceleration need be braked away by the constant speed brake at the end of the downhill run, which is advantageous from a fuel perspective.

According to an embodiment of the present invention, the reference speed $v_{ref}$ is set to a current speed $v_{pres}$ of the vehicle so that $v_{ref}=v_{pres}$ when the user influences the reference speed $v_{ref}$. This embodiment is illustrated in FIG. 4, in which at a first time 1 the user is allowed to abort a raising of the reference speed $v_{ref}$ above the level of the set speed $v_{set}$. The user input sets the reference speed $v_{ref}$ to the speed at which the vehicle is travelling at this first time 1. The result in the example depicted in FIG. 4 is that the vehicle's speed (broken line) reaches just below the lowest permissible speed $v_{min\ glob}$ at the crest of the hill.

At a second time 2, just before the beginning of the downhill run, the user is also allowed to abort a lowering of the reference speed $v_{ref}$ below the level of the set speed $v_{set}$. The user input sets the reference speed $v_{ref}$ to the speed at which the vehicle is travelling at this second time 2. The result is that its speed reaches just over the overall highest permissible speed $v_{max\ glob}$ at the end of the downhill run. It should be noted here that no braking away of energy takes place at the end of the downhill run, since the constant speed brake speed $v_{dhsc}$ is not reached. This embodiment is thus not only economical in energy terms but also makes a user feel that he/she controls the function of the economical cruise control by being able to influence the choice of the reference speed $v_{ref}$ without the constant speed brake being activated.

According to an embodiment of the present invention, the reference speed $v_{ref}$ may be adjusted when the vehicle's current speed $v_{pres}$ is a temporary lowest speed $v_{min\ temp}$. The reference speed $v_{ref}$ is thus here set to a temporary speed minimum $v_{ref}=v_{min\ temp}$. The temporary lowest speed $v_{min\ temp}$ here represents a speed which the vehicle maintains for a brief period, e.g. before a downhill run. The magnitude of the temporary lowest speed $v_{min\ temp}$ depends on a number of parameters, e.g. engine torque demanded and running resistance (comprising inter alia such parameters as topography and vehicle weight).

According to an embodiment of the present invention, the reference speed $v_{ref}$ may be adjusted when the vehicle's current speed $v_{pres}$ is a temporary highest speed $v_{max\ temp}$ and the reference speed $v_{ref}$ is set to a temporary speed maximum $v_{ref}=v_{max\ temp}$. The temporary highest speed $v_{max\ temp}$ here represents a speed which the vehicle maintains for a brief period, e.g. before an uphill run. The magnitude of the temporary highest speed $v_{max\ temp}$ depends on a number of parameters, e.g. engine torque demanded and running resistance.

According to an embodiment of the present invention, the reference speed $v_{ref}$ is adjusted on the basis of the input to an upwardly adjusted value $v_{ref,\ old}+v_{adj}$. According to an embodiment of the present invention, the reference speed $v_{ref}$ is adjusted to a downwardly adjusted value $v_{ref,\ old}-v_{adj}$. In these embodiments, $v_{ref,\ old}$ represents the value which the reference speed was at before the adjustment. By using these embodiments the driver can immediately adjust the reference speed $v_{ref}$ relative to the magnitude of the current reference speed $v_{ref,\ old}$, i.e. relative to the magnitude of the reference speed before the adjustment.

According to an embodiment, after a first input, an upwardly adjusted value $v_{set,\ old}+v_{adj}$ is used as the new value for the set speed, so that $v_{set}=v_{set,\ old}+v_{adj}$. According to an embodiment, after a first input, an downwardly adjusted value $v_{set,\ old}-v_{adj}$ is used as the new value for the set speed, so that $v_{set}=v_{set,\ old}-v_{adj}$.

As described above, in certain embodiments of the present invention the set speed $v_{set}$ is set to an upwardly adjusted value $v_{set,\ old}+v_{adj}$ when the reference speed $v_{ref}$ is adjusted on the basis of user input. In certain embodiments of the present invention the set speed $v_{set}$ is also set to a downwardly adjusted value $v_{set,\ old}-v_{adj}$ when the reference speed $v_{ref}$ is adjusted on the basis of user input. These upwardly or downwardly adjusted values may also be used as new values for the set speed so that $v_{set}=v_{set,\ old}+v_{adj}$ or $v_{set}=v_{set,\ old}-v_{adj}$.

FIG. 5 depicts an embodiment of the invention in which the user by an input at a first time 1 sets the reference speed to a downwardly adjusted value $v_{ref}=v_{ref,\ old}-v_{adj}$ and sets the set speed to a downwardly adjusted value $v_{set}=v_{set,\ old}-v_{adj}$. An input at a second time 2 sets the reference speed to an upwardly adjusted value $v_{ref}=v_{ref,\ old}+v_{adj}$ and sets the set speed to an upwardly adjusted value $v_{set}=v_{set,\ old}+v_{adj}$. It should be noted here that the respective overall maximum permissible speed $v_{max\ glob}$ and overall minimum permissible speed $v_{min\ glob}$ and the constant speed brake speed $v_{dhsc}$ are altered by steps similar to the set speed $v_{set}$.

The result in the example depicted in FIG. 5 is that the vehicle's speed (broken line) touches the lowest permissible speed $v_{min\ glob}$ at the crest of the hill and reaches just over the overall highest permissible speed $v_{max\ glob}$ at the end of the downhill run, without any braking away of energy at the end of the downhill run, since the constant speed brake speed $v_{dhsc}$ is not reached. The result is a cruise control which is economical in energy terms while at the same time the user has the feeling of controlling its function in that he/she can influence the choice of the reference speed $v_{ref}$ and the set speed $v_{set}$ without the constant speed brake being activated.

According to an embodiment of the present invention, the set speed $v_{set}$ is also adjusted when the reference speed $v_{ref}$ is adjusted to a temporary highest speed $v_{max\ temp}$ or to a temporary lowest speed $v_{min,\ temp}$, depending on whether the user input is by means of a certain type of input device, e.g. a steering wheel knob, as depicted in FIG. 6 and described in more detail below. When the user enters inputs by means of some other type of input device, e.g. an accelerator pedal, the set speed $v_{set}$ does not change at the time of input.

According to an embodiment of the invention, an adjustment made applies for a distance S which begins, i.e. has its starting point, when the user enters the input to influence the reference speed $v_{ref}$, and ends when a deactivation condition is fulfilled. In other words, the adjustment applies for a certain distance S beyond which the economical cruise control reverts to its normal function.

Such a deactivation condition in response to which the distance S is deemed to reach its end may be related to one or more events from among a gear change, a braking, a clutch operation, a change of engine torque demanded and a new input from the user. The relevant distance is thus here determined on the basis of one or more events which can at least partly be influenced by a driver of the vehicle. The deactivation condition may also be related to covering a predetermined part of said distance, e.g. the vehicle having travelled any suitable predetermined distance. The distance S may also be regarded as ending at the end of a current uphill or downhill run which the vehicle is close to when the adjustment is made.

The adjustment according to the invention may with advantage be applied during certain particular driving situations, e.g. when travelling uphill or downhill, when overtaking, when accelerating or when driving in a tunnel. The distance S for which the adjustment is to apply is preferably chosen such that the adjustment is maintained during these particular driving situations, thereby providing the vehicle's driver with an intuitively correct driving sensation, which is highly advantageous.

According to an embodiment of the present invention, user input may be by means of one or more input devices, e.g. one or more from among a button, a lever, a knob, a pedal, a touchscreen, a voice input device and a menu choice, e.g. on a visual display screen. Substantially all types of input devices might be used by a driver to put information into the economical cruise control according to the invention. According to an embodiment, inputs via various types of input devices are also implied. Examples of button pressure are cited below in relation to the examples pertaining to FIG. 6.

Inputs by means of an accelerator pedal may in different embodiments have different implications depending on how and/or when the pedal is pressed. For example, a very light pressure on the accelerator pedal may be interpreted by the system as the reference speed $v_{ref}$ being set to a current speed $v_{pres}$ of the vehicle so that $v_{ref}=v_{pres}$. If conversely the driver for example releases the accelerator pedal after having accelerated for a period, this may be interpreted by the system as the reference speed $v_{ref}$ being set to the vehicle's current speed $v_{pres}$, which is a temporary lowest speed $v_{min\ temp}$, so that $v_{ref}=v_{min}$.

According to another embodiment, the position of the pedal takes higher priority than the cruise control for as long as the pedal is depressed, which means that the driver can use the pedal to control the vehicle's speed while the pedal is depressed. In this context the position of the accelerator pedal is therefore disregarded by the system as regards the set speed $v_{set}$ and the reference speed $v_{ref}$, which are therefore not influenced by the pedal when it is kept depressed. When the pedal is released, the set speed $v_{set}$ and the reference speed $v_{ref}$ may again be altered by the system at least partly on the basis of inputs from the driver.

FIG. 6 depicts a non-limitative example of an input device in the form of a button which may be used according to the invention. This button may be accessible in the driver's cab. It may for example be situated on the steering wheel and therefore be easy for the driver to reach.

Some of the possible applications of various embodiments described above of the invention are described below with reference to the button in FIG. 6. It should be noted that each of the applications exemplified below comprises at least one input which results in use of an embodiment of the present invention.

Four different inputs can be effected by means of the button in FIG. 6, on which input A is marked "Res", input B "+", input C "−" and input D "off". These applications described represent non-limitative examples of using the invention and are described to increase understanding of the invention. Similar applications may of course be implemented with any other input device described above than the button in FIG. 6. These input devices may be of any suitable configuration which allows input according to the invention.

In a first example, the set speed $v_{set}$ is initially equal to 80 km/h, the reference speed $v_{ref}$ 74 km/h and the vehicle's current speed $v_{pres}$, 76 km/h. The initial situation is therefore $v_{set}$=80 km/h,
$v_{ref}$=74 km/h, and
$v_{pres}$=76 km/h According to the embodiment described above of the invention, when the adjustment based on the input results in the reference speed $v_{ref}$ being set to the set speed $v_{set}$, the following respective inputs by means of the button in FIG. 6 may produce the following results in this first example:

Input="A": $v_{ref}=v_{set}$=80 km/h (lowering aborted)
Input="B": $v_{ref}=v_{set}$=80 km/h (lowering aborted)
Input="C": $v_{set}$=79 km/h and $v_{ref}$=73 km/h
Input="D": cruise control switched off According to the embodiment described above of the invention, when the adjustment based on the input results in the reference speed $v_{ref}$ being set to an upwardly adjusted value of the set speed $v_{set}=v_{set,\ old}+v_{adj}$, the following respective inputs by means of the button in FIG. 6 may produce the following results in this first example:

Input="A": $v_{ref}=v_{set}$=80 km/h (lowering aborted)
Input="B": $v_{set}=v_{set,\ old}+1$
$v_{ref}=v_{set}$=81 km/h (lowering aborted)
Input="C": $v_{set}$=79 km/h and $v_{ref}$=73 km/h
Input="D": cruise control switched off According to the embodiment described above of the invention, when the adjustment based on the input results in the reference speed $v_{ref}$ being set to an upwardly adjusted value $v_{ref,\ old}+v_{adj}$, the following respective inputs by means of the button in FIG. 6 may produce the following results in this first example:

Input="A": $v_{ref}=v_{set}$=80 km/h (lowering aborted)
Input="B": $v_{set}=v_{set,\ old}+1$=81 km/h
$v_{ref}=v_{ref,\ old}+1$=75 km/h
Input="C": $v_{set}$=79 km/h and $v_{ref}$=73 km/h
Input="D": cruise control switched off According to the embodiment described above of the invention, when the adjustment based on the input results in the reference speed $v_{ref}$ being set to the vehicle's current speed $v_{pres}$, the following respective inputs by means of the button in FIG. 6 may produce the following results in this first example:

Input="A": $v_{ref}=v_{pres}$=76 km/h (lowering aborted)
Input="B": $v_{ref}=v_{pres}$=76 km/h (lowering aborted)
Input="C": $v_{set}$=79 km/h and $v_{ref}$=73 km/h
Input="D": cruise control switched off In a second example, the set speed $v_{set}$ is initially equal to 80 km/h, the reference speed $v_{ref}$ 83 km/h and the vehicle's current speed $v_{pres}$ 82 km/h. The initial situation is therefore $v_{set}$=80 km/h,
$v_{ref}$=83 km/h, and
$v_{pres}$=82 km/h According to the embodiment described above of the invention, when the adjustment based on the input results in the reference speed $v_{ref}$ being set to the set speed $v_{set}$, the following respective inputs by means of the button in FIG. 6 may produce the following results in this second example:

Input="A": $v_{ref}=v_{set}$=80 km/h (raising aborted)
Input="B": $v_{set}$=81 km/h and $v_{ref}$=84 km/h
Input="C": $v_{ref}=v_{set}$=80 km/h (raising aborted)
Input="D": cruise control switched off According to the embodiment described above of the invention, when the adjustment based on the input results in the reference speed $v_{ref}$ being set to an downwardly adjusted value of the set speed $v_{set}=v_{set,\ old}-v_{adj}$, the following respective inputs by means of the button in FIG. 6 may produce the following results in this first second example:
- Input="A": ref=$v_{set}$=80 km/h (raising aborted)
- Input="B": $v_{set}$=81 km/h and $v_{ref}$=84 km/h
- Input="C": $v_{set}$=$v_{set,\ old}$−1,
  $v_{ref}$=$v_{set}$=79 km/h (raising aborted)
- Input="D": cruise control switched off According to the embodiment described above of the invention, when the adjustment based on the input results in the reference speed $v_{ref}$ being set to a downwardly adjusted value $v_{ref,\ old}$−$v_{adj}$, the following respective inputs by means of the button in FIG. 6 may produce the following results in this second example:
- Input="A": $v_{ref}$=$v_{set}$=80 km/h (raising aborted)
- Input="B": $v_{set}$=81 km/h and $v_{ref}$=84 km/h
- Input="C": $v_{set}$=$v_{set,\ old}$−1=79 km/h
  $v_{ref}$=$v_{ref,\ old}$−1=82 km/h
- Input="D": cruise control switched off According to the embodiment described above of the invention, when the adjustment based on the input results in the reference speed $v_{ref}$ being set to the vehicle's current speed $v_{pres}$, the following respective inputs by means of the button in FIG. 6 may produce the following results in this second example:
- Input="B": $v_{set}$=81 km/h and $v_{ref}$=84 km/h
- Input="C": $v_{ref}$=$v_{pres}$=82 km/h (raising aborted)
- Input="D": cruise control switched off One skilled in the art will appreciate that the various functions indicated above pertaining to inputs A, B, C, D in the various embodiments may be combined. For example, a button might thus be implemented such that its function for a pressure A is taken from one of the above examples but its function for a pressure B from another example. The only requirement for such combinations to be possible is that the functions of the examples should not conflict with one another.

In the above examples, the magnitude of the respective upward and downward adjustments $v_{adj}$ of the set speed $v_{set}$ is exemplified by the value one (1), which is the magnitude of the adjustment according to an embodiment of the invention, i.e. $v_{adj}$=1, but their magnitude according to the invention might also assume other values. The respective upward and downward adjustments $v_{adj}$ have according to the invention a value related to the magnitude of the set speed $v_{set}$, e.g. they may have a value corresponding to a percentage x of the set speed $v_{set}$, so that $v_{adj}$=$v_{set}$*x %. According to an embodiment of the invention, the user may him/herself choose the magnitude of the respective upward and downward adjustments $v_{adj}$.

FIG. 7 is a flowchart for the method according to the present invention. The method begins at a first step [701]. As a second step [702], adjustment of at least the reference speed $v_{ref}$ is allowed when it differs from the set speed $v_{set}$. As a third step [703] the adjustment is at least partly based on input from a user.

The present invention relates also to an economical cruise control arranged to demand from an engine system a reference speed $v_{ref}$ which may differ from a chosen set speed $v_{set}$. The economical cruise control according to the invention comprises an adjustment unit adapted to allowing adjustment of at least the reference speed $v_{ref}$ when it differs from the set speed $v_{set}$, i.e. when $v_{ref}$≠$v_{set}$. The adjustment unit is also adapted to basing the adjustment at least partly on input from a user of the economical cruise control.

One skilled in the art will appreciate that a method for an economical cruise control according to the present invention may also be implemented in a computer program which, when executed in a computer, causes the computer to apply the method. The computer program usually takes the form of a computer program product 803 in FIG. 8 stored on a digital storage medium, and is contained in such a product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

FIG. 8 depicts schematically a control unit 800 comprising a calculation unit 801 which may take the form of substantially any suitable type of processor or microcomputer, e.g. a circuit for digital signal processing (digital signal processor, DSP), or a circuit with a predetermined specific function (application specific integrated circuit, ASIC). The calculation unit 801 is connected to a memory unit 802 which is situated in the control unit 800 and which provides the calculation unit with, for example, the stored program code and/or stored data which the calculation unit needs to enable it to do calculations. The calculation unit is also adapted to storing partial or final results of calculations in the memory unit.

The control unit 800 is further provided with respective devices 811, 812, 813, 814 for receiving and sending input and output signals. These input and output signals may comprise waveforms, pulses or other attributes which the input signal receiving devices 811, 813 can detect as information and which can be converted to signals which the calculation unit 801 can process. These signals are then supplied to the calculation unit. The output signal sending devices 812, 814 are arranged to convert signals received from the calculation unit 801 in order, e.g. by modulating them, to create output signals which can be conveyed to other parts of the economical cruise control.

Each of the connections to the respective devices for receiving and sending input and output signals may take the form of one or more from among a cable, a data bus, e.g. a CAN (controller area network) bus, an MOST (media oriented systems transport) bus or some other bus configuration, or a wireless connection.

One skilled in the art will appreciate that the aforesaid computer may take the form of the calculation unit 801 and that the aforesaid memory may take the form of the memory unit 802.

One skilled in the art will appreciate that the above system may be modified according to the various embodiments of the method according to the invention. The invention relates also to a motor vehicle, e.g. a car, truck or bus, provided with at least one economical cruise control according to the invention.

The present invention is not restricted to its embodiments described above but relates to and comprises all embodiments within the protective scope of the attached claims.

The invention claimed is:

1. A method performed by a cruise control of a vehicle, the method comprising the steps of:
   the cruise control controlling an engine system of the vehicle by demanding from the engine system a reference speed $v_{ref}$ which may differ from a set speed $v_{set}$ chosen by a user of the cruise control, and;
   the cruise control controlling the engine system of the vehicle by adjusting at least the reference speed $v_{ref}$, when the reference speed $v_{ref}$ differs from the set speed $v_{set}$, to a second value which is not equal to a first value of $v_{ref}$ chosen by the cruise control before the adjustment, the first value of $v_{ref}$ being based on $v_{set}$, the adjusting being based, at least partly, on input from a user of the cruise control, wherein the input changes the reference speed $v_{ref}$, the input causes the reference speed $v_{ref}$ to be set to a selected one of a plurality of speeds to which the reference speed $v_{ref}$ may be set, and the selected one of the plurality of speeds is a current speed $v_{pres}$ so that $v_{ref}=v_{pres}$.

2. The method according to claim 1, wherein the selected one of the plurality of speeds is the set speed $v_{set}$ so that $v_{ref}=v_{set}$.

3. The method according to claim 2, further comprising the cruise control setting the set speed $v_{set}$ to an upwardly adjusted value $v_{set,\ old}+v_{adj}$ before the adjusting of the reference speed $v_{ref}$, the selected one of the plurality of speeds being $v_{set}=v_{set,\ old}+v_{adj}$ so that $v_{ref}=v_{set}=v_{set,\ old}+v_{adj}$.

4. The method according to claim 2, further comprising the cruise control setting the set speed $v_{set}$ to a downwardly adjusted value $v_{set,\ old}-v_{adj}$ before the adjusting of the reference speed $v_{ref}$, the selected one of the plurality of speeds being $v_{set}=v_{set,\ old}-v_{adj}$ so that $v_{ref}=v_{set}=v_{set,\ old}-v_{adj}$.

5. The method according to claim 1, wherein the current speed $v_{pres}$ is a temporary lowest speed $v_{min\ temp}$ so that $v_{ref}=v_{min\ temp}$.

6. The method according to claim 1, wherein the current speed $v_{pres}$ is a temporary highest speed $v_{max\ temp}$ so that $v_{ref}=v_{max\ temp}$.

7. The method according to claim 1, wherein the selected one of plurality of speeds is an upwardly adjusted value $v_{ref\ old}+v_{adj}$ and the adjusting causes the reference speed $v_{ref}$ to be set to the upwardly adjusted value $v_{ref\ old}+v_{adj}$.

8. The method according to claim 1, wherein the selected one of the plurality of speeds is a downwardly adjusted value $v_{ref\ old}+v_{adj}$ and the adjusting causes the reference speed $v_{ref}$ to be set to the downwardly adjusted value $v_{ref,\ old}-v_{adj}$.

9. The method according to claim 1, wherein the adjusting of the reference speed $v_{ref}$ is applicable for a distance S.

10. The method according to claim 9, in which at least one particular driving situation continues for the distance S.

11. The method according to claim 9, in which an end of the distance S is reached when a deactivation condition is fulfilled.

12. The method according to claim 11, in which the deactivation condition is related to any of events selected from:
   a gear change,
   a braking,
   a clutch operation,
   a change in engine torque demanded,
   a new input by the user, and
   reaching a predetermined part of the distance S.

13. The method according to claim 10 wherein the particular driving situation comprises at least one driving situation selected from:
   an uphill run,
   a downhill run,
   an overtaking,
   an acceleration, and
   a tunnel.

14. The method according to claim 1, wherein the adjusting causes the cruise control to apply a reference speed $v_{ref}$ which according to the cruise control is suboptimised.

15. The method according to claim 1, wherein the adjusting imposes upon a control of the reference speed $v_{ref}$ a limitation which is applied by the cruise control.

16. The method according to claim 1, wherein the input is effected by means of at least one input device selected from:
   a button,
   a lever,
   a knob,
   a pedal,
   a touchscreen,
   a voice input device, and
   a menu choice.

17. The method according to claim 1, wherein the cruise control is configured to use knowledge about sections of road ahead.

18. A computer program product comprising a non-transitory computer-readable medium which contains a computer program which comprises program code and which causes a computer to control a cruise control of a vehicle to perform a method, the method comprising the steps of:

the cruise control controlling an engine system of the vehicle by demanding from the engine system a reference speed $v_{ref}$ which may differ from a set speed $v_{set}$ chosen by a user of the cruise control, and;

the cruise control controlling the engine system of the vehicle by adjusting at least the reference speed $v_{ref}$, when the reference speed $v_{ref}$ differs from the set speed $v_{set}$, to a second value which is not equal to a first value of $v_{ref}$ chosen by the cruise control before the adjusting by the cruise control, the first value of $v_{ref}$ being based on $v_{set}$, the adjusting being based, at least partly, on input from a user of the cruise control, wherein the input changes the reference speed $v_{ref}$, the input causes the reference speed $v_{ref}$ to be set to a selected one of a plurality of speeds to which the reference speed $v_{ref}$ may be set, and the selected one of the plurality of speeds is a current speed $v_{pres}$ so that $v_{ref}=v_{pres}$.

19. A cruise control configured to:

demand from an engine system of a vehicle a reference speed $v_{ref}$ which may differ from a set speed $v_{set}$ chosen by a user of the cruise control, allow adjustment of at least the reference speed $v_{ref}$, when it differs from the set speed $v_{set}$, to a second value which is not equal to a first value of $v_{ref}$ chosen by the cruise control before the adjustment, the first value of $v_{ref}$ being based on $v_{set}$, and base the adjustment, at least partly, on input from a user of the cruise control, wherein the input is configured to change the reference speed $v_{ref}$, the input causes the reference speed $v_{ref}$ to be set to a selected one of a plurality of speeds to which the reference speed $v_{ref}$ may be set, and the selected one of the plurality of speeds is a current speed $v_{pres}$ so that $v_{ref}=v_{pres}$.

* * * * *